May 31, 1966 C. D. FLANAGAN 3,254,180

RAPID-PHASE-TRANSFORMATION THERMOSTATIC DEVICE

Filed Aug. 7, 1961

Charles D. Flanagan, Inventor.

Koenig Pope Senniger and Powers Attorneys.

United States Patent Office 3,254,180
Patented May 31, 1966

3,254,180

RAPID-PHASE-TRANSFORMATION THERMOSTATIC DEVICE

Charles D. Flanagan, Attleboro, Mass., assignor to Texas Instruments Incorporated, Dallas, Tex., a corporation of Delaware Filed Aug. 7, 1961, Ser. No. 129,785
5 Claims. (Cl. 200—113)

This invention relates to thermostatic or thermotropic devices, and with regard to certain more specific features, to so-called snap-acting devices of this class.

Among the several objects of the invention may be noted the provision of a thermostatic or thermotropic device of the so-called snap-acting type which in a composite or bimetallic sheet form does not require so-called non-developable surface geometry, or in monometallic form does not require an auxiliary mechanical system to provide the desired snap action; the provision of a snap-acting thermostatic or thermotropic device of the class described which is operative at a temperature considerably higher than that which is usual in snap-acting devices of this class; and the provision of a device of the class described which may be carried out in comparatively simple, low-cost constructions for operating switch contacts or other apparatus. Other objects and features will be in part apparent and in part pointed out hereinafter.

The invention accordingly comprises the elements and combinations of elements, features of construction, and arrangements of parts which will be exemplified in the structures hereinafter described, and the scope of which will be indicated in the following claims.

In the accompanying drawings, in which several of various possible embodiments of the invention are illustrated, FIG. 1 is a graph illustrating certain relationships between temperatures and coefficients of thermal expansion of certain materials useful in carrying out the invention;

Corresponding reference characters indicate corresponding parts throughout the several views of the drawings.

The term thermotropic is used herein in the sense that a device or element so characterized responds to temperature change by moving in a desired manner. The term thermostatic is used in the sense that a device so characterized is designed by incorporating a suitable thermotropic element to maintain a substantially constant temperature.

Some solid materials such as thermal waxes undergo an abrupt change in volume when changing from a solid to a liquid under heating. Such a rapid change is useful for constructing thermostatic control devices but these materials have the disadvantage of requiring some kind of expansible container for the wax or the like, in both its solid and liquid phases. These are generally known as solid-fill thermostatic devices and generally involve sealing problems necessitating precise control of the manufacture of these devices to avoid leakage, which can render these devices inoperative.

Certain materials, including the metals cobalt (Co) and zirconium (Zr), over large temperature ranges gradually expand or creep with increased temperature, the amount depending upon the normal coefficient of thermal expansion of the material. The thermal expansion characteristics of such materials over these large temperature ranges may be said to be essentially continuous. Such materials exhibit abrupt or discontinuous volume changes at certain temperatures, some of which are comparatively high.

These rapid transitions take place without a change in the solid state of the materials. Employment of such materials (according to the invention to be described) do not require solid-fill containers such as do the solid-fill types of devices. The solid-phase condition of the material is preserved before, during and after the abrupt change and the change constitutes or simulates a snap action, occurring in many cases in less than a fraction of a second or so. In many cases such action occurs in a time interval on the order of a few thousandths of a second. The term "snap action" as employed throughout the specification and claims is intended to include those conditions in which substantial and abrupt movements or volumetric changes take place over a relatively small finite time increment, e.g., on the order of milliseconds, as opposed to so-called creep action conditions.

Figure 1:
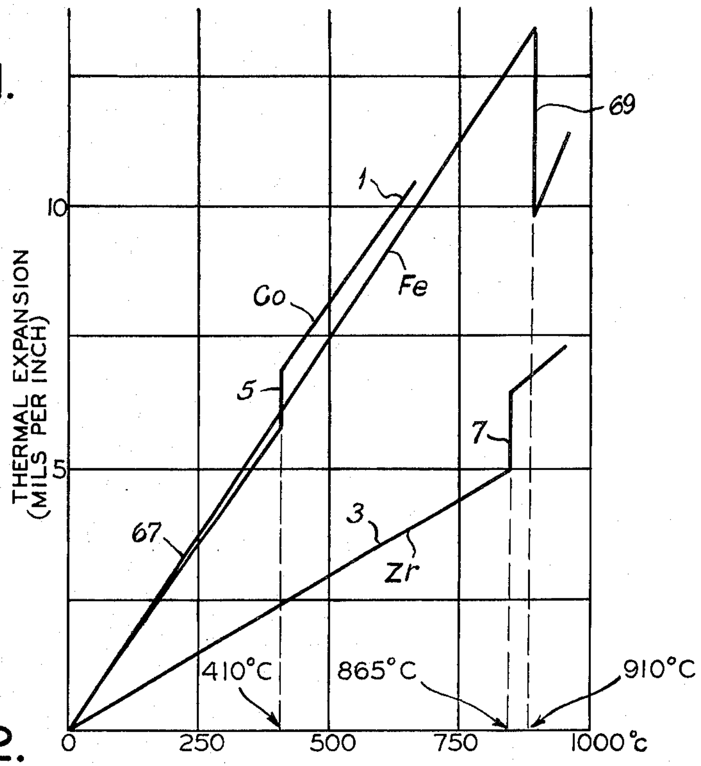

Referring to the FIG. 1 graph, it shows according to lines 1 and 3 for Co and Zr, respectively, that both of these metals gradually expand in volume (often called creep) upon temperature increase until a predetermined and often a comparatively high temperature is reached at which an abrupt change in volume occurs with little or no temperature change after which the gradual expansion or creep again occurs with further temperature increase. The abrupt volume changes, without change of the solid, are shown at steps 5 and 7 on lines 1 and 3, respectively. It will be seen that the abrupt change for cobalt occurs at approximately 410° C. and for zirconium at approximately 865° C. The abrupt change may be characterized as a snap action. The snap action at steps 5 and 7, as distinguished from the creep action illustrated by the remaining portions of lines 1 and 3, is believed to be caused by a sudden change in crystalline structure, accompanied by an abrupt volume change at a particular temperature. I have also discovered that the abrupt phase change is reversible so that the steps such as 5 and 7 are obtained upon temperature rise or fall. The above shows the characteristics of two of the materials suitable for carrying out the invention.

Figure 2:
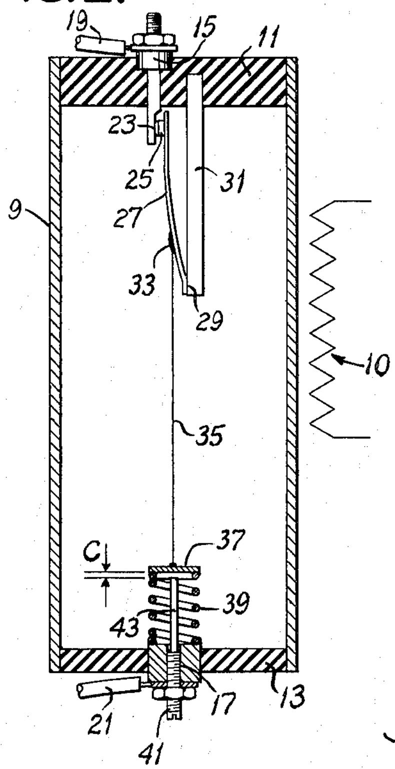
FIG. 2 is an axial section through a switch embodying one form of the invention.

In FIG. 2 is illustrated one practical application employing what may be called a monometallic form of the invention. This application is for control of switch contacts but it is to be understood that other things besides switch contacts may be controlled. Numeral 9 illustrates a molybdenum or like casing capable of withstanding high temperatures obtained from a heat source, suggested diagrammatically at 10. Casing 9 is enclosed at its ends by insulating (for example, ceramic) headers 11 and 13, carrying electrically conductive terminals 15 and 17 for appropriate circuit connections 19 and 21. Extending inwardly from the terminal 15 is a fixed contact 23 with which is engageable and disengageable a movable contact 25. The movable contact 25 is carried upon a contact arm in the form of a leaf spring 27, fastened at 29 to a supporting post 31. Attached at 33 to the spring contact arm 27 is a wire 35, composed of one of the materials such as cobalt or zirconium. In the following, zirconium is used as an example for the material of the wire. The attachment 33 is located between the movable contact 25 and the fastening 29, the latter functioning in the nature of a hinge joint.

The lower end of the zirconium wire 35 is fastened to an electrically conductive plate or disc 37. One end of an electrically conductive tension spring 39 is fastened and electrically connected to the plate 37 and its other end to the terminal 17. This tensions the wire 35. Threaded through the terminal 17 is an adjusting screw 41 from which extends a post 43, the upper end of which is adapted to form a stop against unlimited downward movement of the plate 37. The post 43 is adjusted from screw 41 to effect a clearance C between its upper end and the bottom of plate 37. Since the wire 35 is to operate at a high temperature, the space within the members 9, 11 and 13 is infilled with an inert gas such as argon to prevent destructive oxidation.

The spring arm 27 is formed such that, without any tension therein, it biases the movable contact 25 to separated or open-circuit positions. When tension is applied to the spring 39, as from wire 35, the arm 27 is sprung to the left to close the contacts 23 and 25 with suitable contact pressure.

The connection between the wire 35 and the spring arm 27 is closer to the hinge connection 33 than to the movable contact 25. Thus is obtained a motion-multiplying effect between movement of contact 25 and that received from the wire 35 at 33.

Assuming a rise in temperature of the zirconium wire 35, it will at first tend to elongate by creep action, the spring 39 keeping it stretched in tension to hold the spring arm 27 in sprung condition to maintain contacts 23 and 25 closed under pressure. The post 43 is adjusted from screw 41 so that contact made between it and the disc 37 will occur at a temperature slightly less than the critical phase transformation temperature of the material of the zirconium wire 35. When this transformation occurs, as indicated by step 7 in FIG. 1, the wire in a period of time on the order of one millisecond suddenly elongates with a snap action, thus quickly releasing spring arm 27 to spring at once under its spring bias to the condition wherein the contacts 23 and 25 are separated.

It will be appreciated that, between the time the disc 37 contacts the end of the post 43 and the above-stated snap action, there may be allowed some elongation of the wire 35 by creep; but this by adjustment at 41 is preferably arranged to be of small duration so that the resulting relief of tension in the spring 27 will be insufficient during this interval to allow contacts 23 and 25 to creep open. Thus the contacts 23 and 25 will be opened by action of the leaf spring 27 only by the sudden relief in tension therein as is caused by the snap-acting elongation of the wire 35, disc 37 at this time resting on the stop 43.

Upon cooling, the reverse action takes place. Wire 35 first shortens with snap action, thus rapidly closing contact 23 and tensioning the spring arm 27 for good contact pressure between 23 and 25. Thereafter, shortening of the wire 35 by creep action lifts disc 37 from the end of post 43 as spring 39 stretches slightly. Thus the spring 39 allows thermal override on cooling without overstressing the wire 35, as might occur if the lower end of the wire were rigidly fastened.

It will be understood that, instead of heating the wire 35 through change in ambient temperature rise, it may be heated by current therethrough from the circuit 19–21. In such event the circuit will be automatically opened when the critical phase-change temperature is reached. It will of course reclose upon cooling under open-circuit conditions. The result will be a cyclic opening and closing of the circuit. If desired, suitable arrangements can be made in the circuit for keeping it open elsewhere than at contacts 23 and 25, after it is once opened. It may then be reclosed by suitable automatic or manual means. Circuitry for this purpose is not shown, since such is known in the electrical art.

Figure 3:
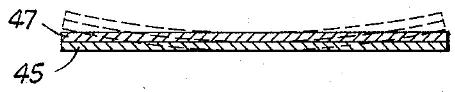
FIG. 3 is a section of a sheet of bimetallic material embodying another form of the invention.

In FIG. 3 is shown what may be referred to as a bimetallic or composite form of the invention. FIG. 3 represents a bimetallic sheet having a component layer 45 bonded to a component layer 47. The component 45 may, for example, be cobalt, zirconium or any other metal which exhibits a phase tranformation analogous to that indicated at 5 or 7 in FIG. 1. The component 47 should be one which does not exhibit such a phase transformation, at all or at least not at the same temperature at which such transformation occurs for component 45. The example in FIG. 3 employs molybdenum for the component 47, which has no such phase transformation. A desired characteristic of the component 47 is that it shall have a normal creep type coefficient of thermal expansion equal to that of the layer 45. Molybdenum and zirconium have approximately equal creep type coefficients of thermal expansion, thus making the zirconium a particularly suitable material for sheet 45.

As shown in solid lines in FIG. 3, the bimetallic sheet 45, 47 may be made to be initially flat. Since the molybdenum and zirconium components have equal creep coefficients of thermal expansion, the composite sheet will remain flat as long as its temperature is beneath the critical phase transformation temperature of the layer 45. When that temperature is reached, the component 45, within a time on the order of milliseconds, will abruptly expand (snap-act) and place the bimetallic sheet in the curved position shown by the dotted lines. Upon cooling, it will with snap action return to the solid-line position at the critical temperature of phase transformation.

While I have selected a flat initial configuration for the composite sheet 45, 47 when below the critical phase transformation temperature, it will be understood that other initial shapes may be employed. However, no nondevelopable nonflat initial shapes are necessary for the snap action as is usual in the case of snap-acting bimetallic or like thermostats. In the latter structures the nondevelopable or like type of initial configuration is necessary, with some attendant complications in construction, which are hereby obviated.

Figure 4:
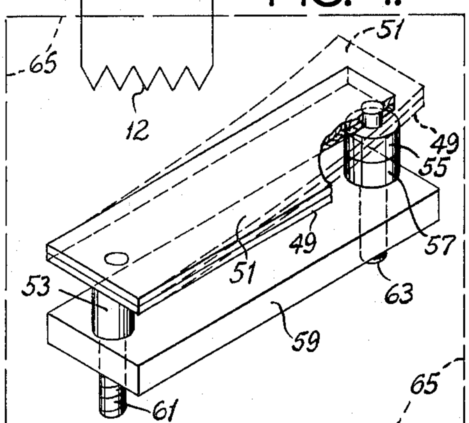
FIG. 4 is an isometric view of apparatus embodying the form of the invention shown in FIG. 3.

In FIG. 4 is shown an application of the form of the invention shown in FIG. 3, wherein a composite thermostatic sheet is composed of a zirconium component 49 and a molybdenum component 51 having equal creep type coefficients of thermal expansion. This sheet is provided at one end with a conductive terminal post 53 and at the other end with a contact 55 engageable and disengageable with a fixed contact 57. Post 53 and contact 57 are carried on an insulating base 59 and have respective line terminals 61 and 63 attached thereto. The whole switch may be located in a gas-tight compartment filled with an inert gas such as argon. This compartment is suggested by the dotted lines 65, further details being unnecessary, since its construction can be readily accomplished by those skilled in the art. A heat source or conventional heater is schematically illustrated at 12. The flat condition or initial configuration of the bimetallic sheet 49, 51, as shown by solid lines in FIG. 4 (wherein the contacts 55 and 57 are closed), is maintained under all temperature values below the temperature at which the zirconium suddenly expands and causes sudden curvature. Below the latter temperature, both layers enlarge at the same rate by creep and hence do not buckle into any curved form and substantially retain their initial configuration. The dotted-line position shows a second configuration or a curved position reached by snap action when the critical phase-change temperature is reached. In this condition, the contacts 55 and 57 have opened. The switch will reclose with snap action upon cooling.

In this form of the invention the bimetal sheet 49, 51 may also be current-heated, instead of from heat source 12. In such event, as stated in connection with the construction described in FIG. 2, suitable circuitry may be employed to maintain an open condition of the circuit elsewhere for any desired length of time after the contacts 55 and 57 have reclosed.

It is considered to be within the scope of the composite form of the invention to employ bonded components, each of which has a phase change at a different temperature but both of which have substantially equal creep coefficients of thermal expansion. By operating such a device in a temperature range including the critical phase-change temperature of the one having the lowest phase-change temperature and excluding the phase-change temperature of the one having the highest, the same type of result will be obtained as for the FIG. 3 form. Or, assume for example that a flat bimetallic sheet such as shown in solid lines in FIG. 3 is composed of bonded cobalt and zirconium layers. This sheet is subject to temperature rise so that, at first, slow change in curvature will occur due to the different creep coefficients of thermal expansions of the two metals. Then upon reaching the critical phase-change temperature of the cobalt sheet (i.e., about 410° C.) a new curvature or configuration is obtained with snap action. Then further upon reaching the phase-change temperature of the zirconium, i.e., about 865° C., the composite sheet will snap back to one of its former curvatures or configurations and upon further heating it will again proceed to change curvature by creep action in the original direction of curvature change.

I have discovered also that some materials such as substantially pure iron (Fe) have a creep type coefficient of thermal expansion and exhibit a snap-acting contraction in reverse upon reaching a critical phase-change temperature. Thus in FIG. 1 is shown a curve 67, illustrating this for Fe. Its phase change is exhibited at about 910° C. (see the step 69). It will thus be seen that by joining a sheet of such iron with a sheet such as molybdenum in flat configuration, curvature will be slowly introduced upon temperature rise by creep action due to the differences of creep coefficients of thermal expansion of the two metals. Upon reaching the critical phase-change temperature of the iron, the sheet will change shape with snap action. It will be clear that by combining a cobalt or a zirconium sheet with an iron sheet, successive changes of curvature will occur in opposite directions.

In the above description, cobalt, zirconium and iron have been mentioned as suitable materials to be used as snap-acting control elements but others that may be mentioned are titanium, manganese, or rhodium. While some of these do not have as great a change of volume under phase transformation as contemplated above, they have use in constructions in which the higher volume changes and motion effects are not required.

It is pointed out that any impurities which may occur in metals useful to the invention will shift the transition characteristics such as 5, 7, 69, and, depending upon the extent of the impurities, may substantially change such characteristics.

It will be understood that although contacts have been illustrated as examples of apparatus to be operated by means of the invention, other apparatus may be operated, such as ratchets, escapements and the like.

In view of the above, it will be seen that the several objects of the invention are achieved and other advantageous results attained.

As various changes could be made in the above constructions without departing from the scope of the invention, it is intended that all matter contained in the above description or shown in the accompanying drawings shall be interpreted as illustrative and not in a limiting sense.

I claim:

1. A thermostatic snap-acting electric switching device comprising a fixed contact, a relatively movable contact, an element consisting of a solid-phase material characterized by a gradual volume change which occurs over a substantial temperature range and by a solid-phase crystalline transformation which occurs at a certain temperature accompanied by a snap-acting change in volume over a small part of said temperature range, said snap-acting change occurring on the order of a few thousands of a second, means connected with said element and with said movable contact for translating said snap-acting volume change into snap-acting motion of the movable contact of a substantial amount over an interval on said order of a few thousandths of a second, and means for heating said material to said certain temperature to bring about said motion of the movable contact.

2. A thermostatic device according to claim 1, wherein said element of solid-phase material is in the form of a layer, said translating means is also in the form of a layer, said layers being interfacially bonded to form a composite sheet, the materials of said layers having substantially equal coefficients of thermal expansion throughout said substantial temperature range with the exception of said small part of the range during which said solid-phase transformation takes place in one material, both of said forms being subject to said heating.

3. A thermostatic device according to claim 2, wherein one of said layers is molybdenum and the other is zirconium.

4. A thermostatic device comprising a composite of bonded layers, said layers consisting essentially of solid-phase materials characterized in that the materials of both of said layers over a substantial temperature range gradually change volumes, each of said materials being additionally characterized by a reversible solid-phase crystalline transformation which occurs at a certain temperature different from that of the other and accompanied by a snap-acting change in volume in a small part of the temperature range, said snap-acting change occurring on the order of a few thousandths of a second and means for heating both layers through said temperatures to obtain successive snap-acting deflections of the composite at said temperatures without such deflections throughout other temperatures in said range.

5. A thermostatic device according to claim 4, wherein one layer is a metal selected from the group consisting of zirconium, cobalt and iron, and the other is a metal selected from one of the remaining two members of said group.

References Cited by the Examiner

UNITED STATES PATENTS

| | | | |
|---|---|---|---|
| 499,425 | 6/1893 | Haskins | 200—113 |
| 721,602 | 2/1903 | Potter | 200—122 |
| 2,315,565 | 4/1943 | Waltenburg. | |
| 2,493,603 | 1/1950 | Thomas | 200—113 |
| 2,764,650 | 9/1956 | Hodson | 200—122 |
| 3,002,386 | 10/1961 | Flanagan | 200—113 |
| 3,041,425 | 6/1962 | Bohmer | 200—113 |
| 3,108,166 | 10/1963 | Baker et al. | 200—122 |

FOREIGN PATENTS 663,355 8/1938 Germany.

OTHER REFERENCES

Hansen, Max, Constitution of Binary Alloys, New York, McGraw-Hill, 1958 (pp. 354, 476 and 742 relied on).

BERNARD A. GILHEANY, *Primary Examiner.*

ROBERT K. SCHAEFER, *Examiner.*

J. S. IANDIORIO, L. A. WRIGHT, *Assistant Examiners.*